UNITED STATES PATENT OFFICE.

PHILIP MAURO, OF WASHINGTON, DISTRICT OF COLUMBIA, ADMINISTRATOR OF WILLIAM WHITE, DECEASED, ASSIGNOR TO HELEN WHITE, OF WOODSIDE VILLA, ENGLAND.

PROCESS OF SOLIDIFYING LIQUID ACIDS.

SPECIFICATION forming part of Letters Patent No. 475,586, dated May 24, 1892.

Application filed January 8, 1892. Serial No. 417,356. (No specimens.) Patented in England December 12, 1887, No. 17,095.

*To all whom it may concern:*

Be it known that WILLIAM WHITE, deceased, late a subject of the Queen of Great Britain, and a resident of Cheshunt, Hertfordshire, England, did in his lifetime invent a new and useful Improvement in Processes of Solidifying Liquid Acids, (for which invention Letters Patent have been issued in England, No. 17,095, dated December 12, 1887,) which is fully set forth in the following specification.

The object of this invention is to so treat certain acids that they can be conveniently packed and transported with safety and without danger of spilling.

According to this invention there is mixed with the acid to be solidified a salt which will crystallize with the water of the acid so as to solidify it. The salt should be one which will not cause objectionable chemical combination or decomposition. For the treatment of sulphuric acid, sulphate of sodium (including, of course, the bisulphate) or sulphate of calcium or of magnesium are suitable. For hydrochloric acid chloride of calcium or of magnesium are suitable, and for nitric acid sulphate of sodium or nitrate of calcium may be used. Having ascertained the quantity of water in the acid to be treated, there is added to the acid the solidifying agent in quantity sufficient to crystallize with the water, and to assist the operation it is preferred to heat and agitate the mixture. When solution is effected, it is allowed to cool and it then solidifies. The salt with which the acid is thus combined in many cases does not interfere with the uses of the acid. For instance, sulphuric acid with sulphate (or bisulphate) of sodium acts as energetically on carbonate of calcium and water as does acid used alone.

I am aware that heretofore it has been proposed to mix with liquid acids certain insoluble substances—such as fossil meal, comminuted mica, and the like—so as to produce a pasty or semi-solid mass; but obviously the result of such process is essentially different from that obtained by adding soluble salts in quantity sufficient to crystallize with the water.

In the production of the pasty mass above referred to the insoluble substance acts as a sponge to absorb the moisture, and hence the true solid state can only be approximated, whereas, according to the present invention, the liquid of the acid is taken up as water of crystallization and the result of the treatment is a solid mass in crystalline form.

Having now particularly described and ascertained the nature of the said invention and in what manner the same is to be performed, I declare that what I claim as the invention of the said WILLIAM WHITE is—

The process of solidifying liquid acids, which consists in adding thereto a soluble salt adapted to crystallize with the water, substantially as herein described.

In testimony whereof I have signed this specification in the presence of two subscribing witnesses.

PHILIP MAURO,
*Administrator of the Estate of William White, Deceased.*

Witnesses:
JONATHAN CILLEY,
E. L. WHITE.